July 5, 1966 P. L. JESSEN 3,259,859

POWER DIVIDER AND ATTENUATOR

Filed March 15, 1962

INVENTOR.
PHILLIP L. JESSEN
BY
Anderson, Spangler & Wymore
ATTORNEYS

United States Patent Office 3,259,859
Patented July 5, 1966

3,259,859
POWER DIVIDER AND ATTENUATOR

Phillip L. Jessen, Colorado Springs, Colo., assignor to Kaman Aircraft Corporation, Bloomfield, Conn., a corporation of Connecticut Filed Mar. 15, 1962, Ser. No. 179,873
12 Claims. (Cl. 333—81)

This invention relates to radio frequency power dividers and attenuators and more particularly to a novel high power radio frequency power divider and attenuator.

In applications where relatively high power output levels of radio frequency in the microwave range is encountered, it is often desirable to be able to control the power output. In such applications as transmitters for use in calibrating and testing of antenna ranges, it is highly desirable to provide means for obtaining known transmitter power outputs for the purpose of making antenna measurements. Also in the testing of radar transmission components, where use is made of high power microwave equipment, it is desirable to provide known amounts of microwave power for testing purposes. At low or medium powers, the control of power output is not as difficult as the control at high power but the devices used hereto for low or medium power applications suffered from limitations on power absorption, minimum insertion loss and voltage standing wave ratios (V.S.W.R.).

It is an important object of the present invention to provide a variable radio frequency attenuator and power divider which will overcome these objections even when used with high power levels.

It is a further important object of the present invention to provide a novel variable frequency attenuator wherein the power dissipating portion may be positioned and arranged to be externally cooled for efficient handling of high power levels.

In accordance with the invention, the radio frequency power attenuator comprises moveable vane means positioned intermediate two planar conductors in a microwave transmission line and preferably in electrical continuity with one such conductor. The free end of the vane is selectably moveable to desired positions between the conductors and the vane forms another two plane conductor system with a portion and/or extension of the conductor to which it is attached, which latter system terminates in a lossy material. The position of the free end of the vane between the conductors of the first system determines what portion of the radio frequency power is diverted into the second system to be dissipated in the lossy material. The lossy material may include means, such as cooling means, for carrying away heat formed in the dissipation therein of radio frequency energy.

For a better understanding of the present invention, together with other and further objects thereof, reference is had to the following description taken in connection with the accompanying drawings and its scope will be pointed out in the appended claims.

Referring to the drawings.

Figures 1, 2, 7:
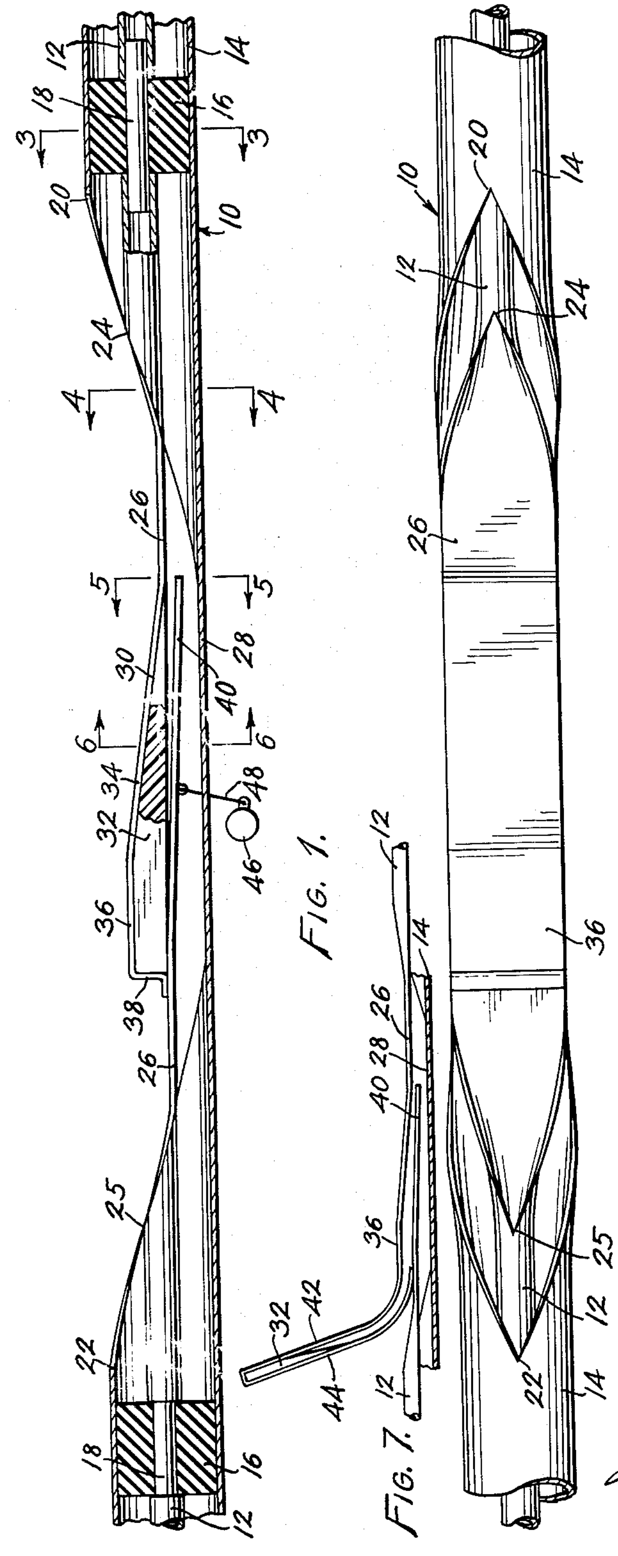
FIGURE 1 is a view in elevation of one embodiment of the invention, partly in section and partly broken away to conserve space.
FIGURE 2 is a plan view of the embodiment of FIGURE 1.
FIGURE 7 is a view in elevation of another embodiment of the invention, partly in section and partly broken away to conserve space, wherein provision is made to utilize external cooling.

Referring to the drawings, FIGURES 1 and 2 illustrate a coaxial line 10 which has an inner or center conductor 12 and an outer conductor 14. The coaxial line 10 is conveniently shown as an air dielectric coaxial line in which the center conductor 12 is supported by beads 16 of insulation material. The center conductor 12 is preferably undercut at the points of support to compensate for the dielectric constant of the insulation material so that a constant impedance line is obtained. This may be accomplished as illustrated by using lengths of hollow tubing for the center conductor which are joined at points of support by means of rods 18 force fit into the center conductor 12.

Figure 3:
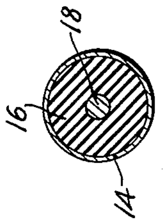
FIGURE 3 is a view along line 3—3 of FIGURE 1.
Figure 4:
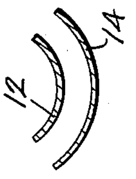
FIGURE 4 is a view along line 4—4 of FIGURE 1.
Figure 5:
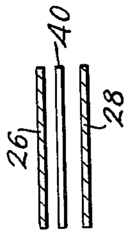
FIGURE 5 is a view along line 5—5 of FIGURE 1.
Figure 6:
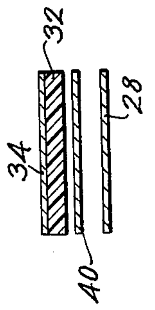
FIGURE 6 is a view along line 6—6 of FIGURE 1.

The outer conductor 14 is slit starting at a point 20 to the right in FIGURE 1, which slit extends to the left with the slit ending at point 22. The center conductor is also slit starting at a point 24 to the right in FIGURE 1 and ending at point 25 to the left. The center and outer conductors, 12 and 14, are gradually spread to provide a gradual transition to a pair of strip lines 26 and 28. This transition is depicted in FIGURES 3–5 and as illustrated material is gradually removed from the outer conductor in progressing to the left from point 20 to form the parallel lines 26 and 28 shown in FIGURE 5. Material is removed from the outer conductor 14 so as to produce minimum mismatch for a particular bandwidth of frequencies.

The structure, shown in FIGURES 1 and 2, produces an impedance matching transition from a coaxial line to a balanced strip line. The transition is accomplished by cutting open the outer wall of the coax and the inner wall of the hollow center conductor so that a cross section view shows a sector of the outer conductor removed.

Broadband impedance matching properties are obtained by utilizing a continuous transmission line taper in going from conductors 12 and 14 to strip lines 26 and 28. Reference is made to an article entitled "A Transmission Line Taper of Improved Design," by R. W. Klopfenstein in the January 1956 issue of the Proceedings of the I.R.E., pages 31–35, which shows that for a tapered coaxial line matching section there is an optimum shape of the taper for a particular impedance transformation and a particular length in which the transfer can be made. As described in the preceding article, the characteristic impedance of the transition is tapered along its length so that the input reflection coefficient follows a Tchebycheff response in the pass band. The length of the taper is determined by the lowest operating frequency and the maximum reflection coefficient which is to occur in the pass band. There is no upper frequency limit other than the frequency where higher order coaxial modes are supported or where radiation from the strip line becomes appreciable.

The end of the device to the right in FIGURES 1 and 2 constitutes the input and the output is to the left. The transition from a coaxial line input to the strip conductors and from the strip conductors into a coaxial line output is similarly accomplished. Strip conductor 26, intermediate the input and output ends is provided with a tapered recess 30 opening into the space between strip conductors 26 and 28. A slab 32 and the like of lossy material is positioned within the recess and is provided with a tapered leading edge in the direction of the input end of the device. The recess is formed of a tapered portion 34 connected to strip conductor 26 and tapering upwardly and to the left. Taper portion 34 is connected to a portion 36 in spaced parallel relation to conductor 26 and a downturned portion 38 connects portion 34 and an extension of conductor 26 adjacent the output end of the device. A vane 40 is connected to conductor 26 near the output end to extend to the right and be coextensive with the opening of recess 30. Vane 40 is adapted to flex with the free end thereof toward the input end being selectively positionable between conductors 26 and 28. Suitable actuators 46 and the like may be connected to vane 40 by appropriate linkage 48 for mechanically or electrically positioning of the vane and which may be adapted to indicate the attenuation being placed in a system by the device.

Vane 40 in conjunction with the tapered portion 34 forms another pair of transmission lines terminating in a lossy material which absorbs energy directed thereinto. It has been found that by varying the positioning of the energy transmitting or "lossless" vane 40, greater or lesser amounts of energy are diverted from the strip conductors 26 and 28 into the lossy material 32 where it is absorbed. Vane 40 serves only to divert the electrical field and substantially no energy is lost thereto. The lossy material is provided with a tapered leading edge to minimize the reflection of energy back into the input or source.

The attenuator of this invention is capable of operating at very high power levels with good accuracy because changes in the lossy material 32 as a function of temperature do not affect the accuracy of the attenuator. The configuration of the lossy material is quite flexible because the amount of the loss in the material is not critical as long as it is sufficiently great to provide the requisite absorption of energy for a given application. For very high power applications the lossy material can be completely remote of the power dividing portions of the attenuator and may be air or liquid cooled. So long as the lossy material meets the requirements of having a sufficient energy dissipation capability, the attenuation of the device is a function only of the position of the vane or flap 40 relative to strip conductors 26 and 28.

In an attenuator according to the present invention wherein tests were conducted with frequencies in the range of from about 800 megacycles to about 3,500 megacycles, the minimum attenuation attainable averaged about 0.3 db and did not vary significantly from this value over the entire range of frequencies tested. The maximum attenuation attainable in these tests averaged approximately 15 db across the frequency band. Attenuations in excess of this figure may be attainable by maintaining closer tolerances in the mating surfaces of the vane and the lower conductor.

Referring to FIGURE 7, there is illustrated an embodiment according to the invention wherein the lossy material is positioned remote of the power dividing portions and may be externally cooled. It will be seen that the transmission pair formed by vane 40 and portion 36 is extended in a direction away from the power dividing portion via strip lines 42 and 44 and a slab of lossy material 32 is positioned between the strip lines near the terminus thereof. A cooling fluid (not shown) may be passed through or over the lossy material to remove the heat developed therein by the absorption of energy or in certain cases the cooling fluid, either alone or in combination with other lossy material, may provide the necessary loss characteristics.

While there have been described what at present are considered to be the preferred embodiments of this invention, it will be obvious to those skilled in the art that various changes and modifications may be made therein without departing from the invention. It is aimed therefore in the appended claims to cover all such changes and modifications which fall within the true spirit and scope of the invention.

What is claimed is:

1. A power divider and attenuator for electrical energy comprising a pair of parallel transmission lines having an input and an output, a coaxial waveguide connected to the input and the output having an outer and an inner conductor, a slit formed in the outer conductor of said coaxial waveguide adjacent said input and output and the material of the outer conductor progressively removed as a function of distance from the start of the split until a pair of parallel lines are formed by the inner conductor and the remnant of the outer conductor connecting said input and output, a recess formed in one of said lines intermediate said input and output opposing said other line, a moveable vane mounted at one end on said one line to be in registry with said recess with the other end thereof, most closely adjacent the input, being adapted to be positioned at selected positions intermediate said pair of lines and a lossy material positioned within said recess.

2. A power divider and attenuator according to claim 1 wherein the recess has a portion thereof tapered toward said input to minimize reflection of energy back to said input.

3. A power divider and attenuator according to claim 2 wherein the recess has a portion thereof toward said output forming a second pair of parallel lines with said one line.

4. A power divider and attenuator according to claim 2 wherein the lossy material is provided with a tapered leading edge toward said input.

5. A power divider and attenuator according to claim 3, wherein said second pair of parallel lines formed by said recess and said one line are extended to be remote of the the recess and the lossy material is positioned within such extension to permit external cooling thereof.

6. A power divider and attenuator for electrical energy comprising a coaxial waveguide formed with an inner and outer conductor, a slit formed in the outer conductor starting and ending at spaced points along the length thereof and the material of the outer conductor being progressively removed as a function of distance respectively from the start and end of the slit until a pair of strip lines are formed therebetween comprising the inner conductor converted to a strip and the remnant of the outer conductor of the coaxial line changed to a strip form, a recess formed in one of said lines opposing the other line, a moveable vane having one end thereof mounted on said one line to be in registry with said recess and the other end thereof being free and adapted to be selectively positioned at points intermediate said pair of lines and a lossy material positioned within said recess.

7. A power divider and attenuator according to claim 6 wherein the recess has a portion thereof tapered toward a coaxial waveguide to minimize reflection of energy received therefrom.

8. A power divider and attenuator according to claim 7 wherein the recess has a portion thereof forming a second pair of strip lines with said one line.

9. A power divider and attenuator according to claim 7 wherein the lossy material has a tapered leading edge coextensive with and corresponding to the taper of the recess.

10. A power divider and attenuator according to claim 8 wherein said second pair of strip lines formed by said recess and said one line are extended to be remote of said recess and the lossy material is positioned within such extension to permit external cooling thereof.

11. A power divider and attenuator for electrical energy comprising a pair of parallel transmission lines, having an input and an output, a recess formed in one of said lines intermediate the input and output in a direction away from said other line, a movable vane mounted at one end on said one line in position to effect a closure for said recess with the other end being free and adapted to be positioned at selected positions intermediate said lines which recess is provided with a tapered portion, tapered toward the input to minimize reflection of energy received thereby back to the input, and another portion beyond the tapered portion toward said output forming with said one line a second pair of parallel lines extended to be remote of said first parallel lines and a lossy material positioned within the recess extension to permit external cooling of said lossy material.

12. A power divider and attenuator for electrical energy comprising a pair of parallel transmission lines, having an input and an output, a recess formed in one of said lines intermediate the input and output in a direction away from said other line, a movable energy transmitting vane mounted at one end on said one line in position to effect a closure for said recess with the other end being free and adapted to be positioned at selected positions intermediate said lines and a lossy material positioned within said recess wherein the recess is provided with a tapered portion and has a portion beyond the tapered portion toward said output forming with said one line and said vane a second pair of parallel lines.

References Cited by the Examiner

UNITED STATES PATENTS

| | | | |
|---|---|---|---|
| 2,725,535 | 11/1955 | Grieg et al. | 333—84 |

| | | | |
|---|---|---|---|
| 2,825,875 | 3/1958 | Arditi | 333—84 |
| 2,825,876 | 3/1958 | Le Vine et al. | 333—34 |
| 2,909,736 | 10/1959 | Semmers | 333—81 |
| 2,924,793 | 2/1960 | Englemann et al. | 333—81 |
| 2,979,676 | 4/1961 | Rueger | 333—34 |
| 2,979,678 | 4/1961 | Dwork | 333—81 |
| 3,002,164 | 9/1961 | Wilson | 333—24 |
| 3,019,402 | 1/1962 | Lanctot | 333—81 |

HERMAN KARL SAALBACH, *Primary Examiner.*

C. BARAFF, *Assistant Examiner.*